Aug. 13, 1940.  T. E. FAILING ET AL  2,211,454
PISTON PACKING
Filed Nov. 29, 1937
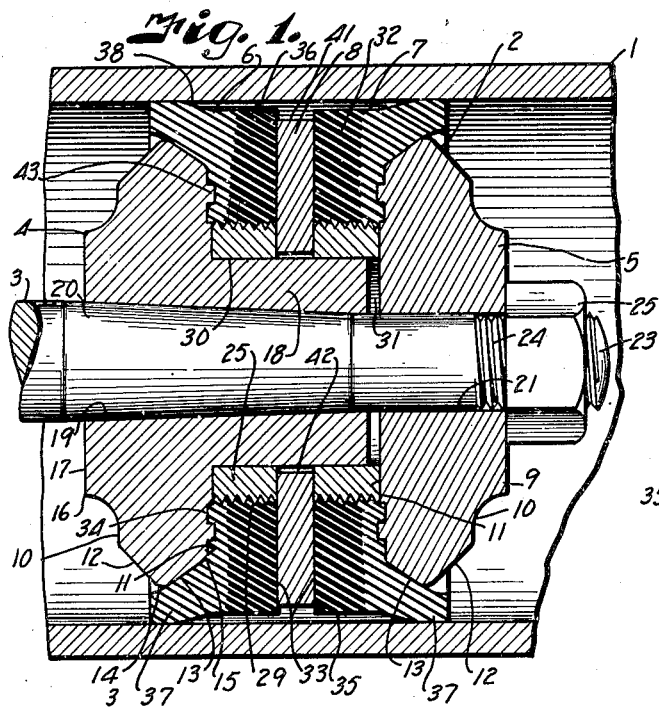
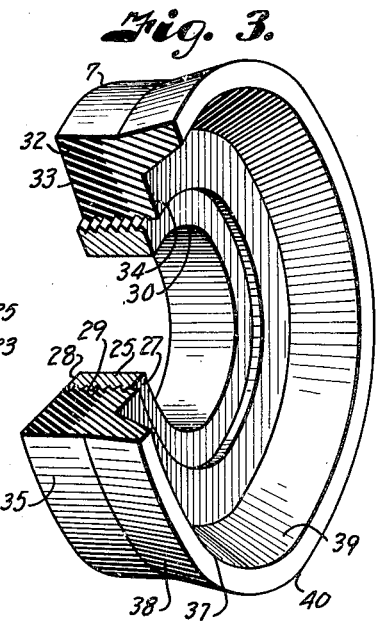
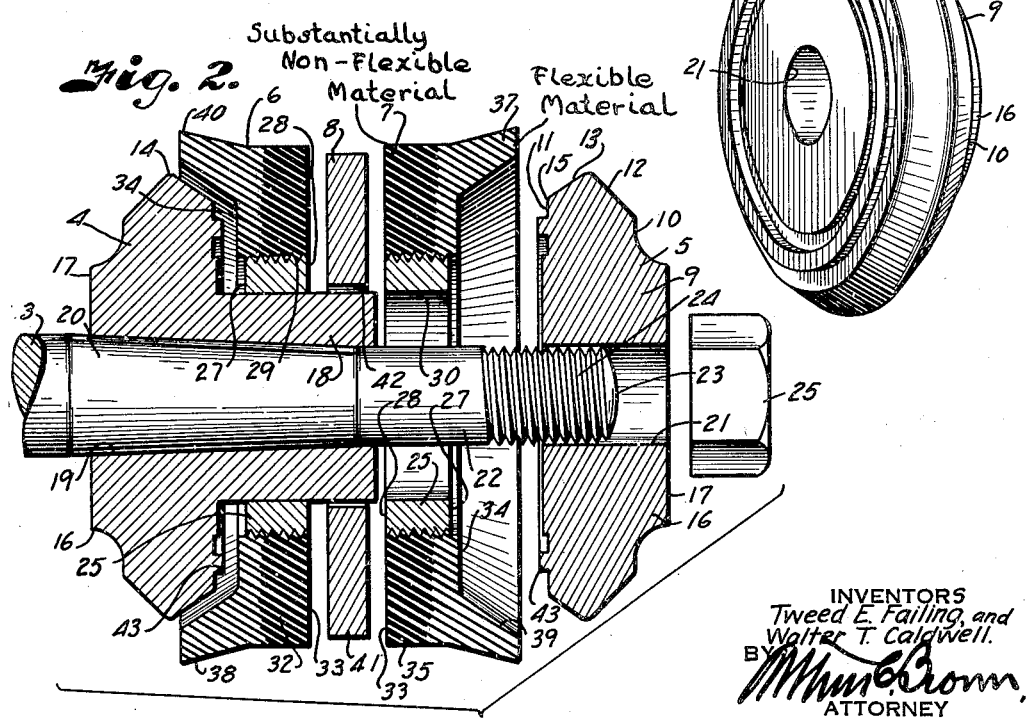
INVENTORS
Tweed E. Failing, and
Walter T. Caldwell.
BY
ATTORNEY Patented Aug. 13, 1940

2,211,454

UNITED STATES PATENT OFFICE 2,211,454

PISTON PACKING

Tweed E. Failing, Houston, Tex., and Walter T. Caldwell, Enid, Okla., assignors to The George E. Failing Supply Company, Enid, Okla., a corporation of Oklahoma Application November 29, 1937, Serial No. 176,967

2 Claims. (Cl. 309—23)

REISSUED SEP. 1942

This invention relates to pistons and particularly those for use in pumps, hydraulic jacks and like devices wherein it is necessary to maintain a close seal with the wall of a cylinder responsive to fluid pressure acting against the piston. Pistons of this character are usually equipped with ring-like packing cups formed of soft leather, rubber and similar highly resilient materials so that they are sufficiently flexible to effect the required seal.

While such packings are serviceable for short periods under low working pressures, their soft resilient character soon subjects them to distortion and leakage results. Moreover, such packings do not have sufficient body to withstand the high working pressures and they are difficult to anchor in the piston structure so as to eliminate leakage through the piston assembly.

It is, therefore, the principal object of the present invention to provide a piston equipped with packing rings having sealing portions sufficiently resilient to effect an adequate seal with the cylinder wall and having body portions that are sufficiently rigid to be tightly secured in a piston assembly. It is also an important object of the present invention to provide a piston structure wherein the clamping members more effectively cooperate with the packing rings to prevent leakage through the interior of the piston.

In accomplishing these and other objects of our invention, as hereinafter pointed out, we have provided improved details of structure, the preferred form of which is illustrated in the accompanying drawing wherein:

Fig. 1 is a longitudinal sectional view through a piston constructed in accordance with the present invention and illustrating the piston as it appears within a working cylinder.

Fig. 2 is a similar section through the parts of the piston, which are shown in slightly spaced relation to better illustrate their construction and the normal shape of the packing rings before they are clamped in the piston assembly.

Fig. 3 is a perspective view of one of the packing rings, a part of which is broken away to show the construction thereof.

Fig. 4 is a perspective view of one of the packing ring clamping members particularly illustrating the sealing rib thereon.

Referring more in detail to the drawing:

I designates a portion of the cylinder of a pump, hydraulic jack or similar apparatus wherein a fluid is acted upon by a piston 2 under high working pressures as in the case of a pump or wherein a high pressure fluid operates the piston as in the instance of a hydraulic jack. In either instance, the piston is slidable relative to the cylinder under control of a piston rod 3 and it is necessary to maintain a tight seal about the periphery of the piston to prevent leakage of fluid around and through the piston. The piston 2 is constructed in accordance with the present invention and is designed to maintain a seal between high pressure fluids in the respective ends of the cylinder as in the case of a double acting pump or a hydraulic jack where the pressure fluid acts on both ends of the piston.

The piston is of composite construction and includes a pair of clamping members or heads 4 and 5 for retaining oppositely facing packing rings 6 and 7 that are separated by a spacing plate 8. The clamping members 4 and 5 each include a substantially disc-like body 9 of a thickness to withstand the necessary working pressures and of smaller diameter than the inner diameter of the cylinder to accommodate flexible lips or flanges on the packing rings as later described.

The peripheral corners of the discs are beveled from the end faces 10 and 11 toward the center thereof as indicated at 12 and 13 to terminate in a round periphery 14. The beveled faces 13 of the respective discs constitute annular seating faces for the lip portions of the packing rings and the junctures thereof with the end faces 11 are slightly rounded, as at 15. The opposite end faces 10 of the discs carry outwardly projecting cylindrical bosses 16 having flat end faces 17.

The disc-like body of the clamping member 4 has an axial hub or collar 18 projecting from the end face 11 thereof and which is of sufficient length to mount the packing rings 6 and 7 and the spacing plate 8 thereon so that the packing elements are retained concentric with the axis of the piston and are clamped against the end or clamping faces 13 of the respective members 4 and 5. The member 4 is further provided with a tapered axial bore 19 with its larger end opening through the boss 16 thereof to accommodate a correspondingly tapered portion 20 of the piston rod 3. The clamping member 5 is not provided with a collar 18 but has a straight cylindrical axial bore 21 registering with the smaller end of the tapered bore of the other member to accommodate a cylindrical extension 22 of the piston rod. The terminal end 23 of the rod projects from the boss 16 of the clamping member 5 and is provided with threads 24 for mounting a jam-nut 25. The clamping member 4 when mounted on the tapered portion of the piston rod is securely wedged from longitudinal movement and forms an abutment against which the packing elements are pressed by the other clamping member which is slidably movable on the extension 22 responsive to tightening of the nut 25.

The packing elements 6 and 7 are constructed with resilient perimeters that are adapted to sealingly engage the working face of the cylinder responsive to fluid pressures acting upon the respective ends of the piston and the body portions thereof are sufficiently rigid so that they may be securely anchored between the clamping members with only slight distortion.

The packing elements 6 and 7 are of the same construction and each includes a preferably metal base or spacing ring 26 having flat end faces 27 and 28 and an annularly ribbed or studded peripheral face 29. The central openings 30 in the rings 26 are of suitable diameter to be snugly slidable on the collar 18 of the clamping member 4 and their combined thickness, together with that of the spacing plate 8 is slightly greater than the length of the collar to provide a space 31 between the end of the collar and the clamping face of the member 5 when the parts of the piston are drawn into clamping relation, as shown in Fig. 1.

Vulcanized to the ribbed periphery of the base ring is an annulus 32 of slightly yieldable material such as hard rubber, having a flat face 33 registering with the end face 28 of the base ring. The peripheries 35 of the annulus are substantially cylindrical and are of such diameter as to provide an annular space 36 therearound, as clearly shown in Fig. 1.

Formed on the side of the annulus opposite the face 33, is a facing 34 of resilient material such as soft rubber having a laterally projecting annular flange 37 overlying one of the seating bevels 13. The facing 34 is autogenously connected with the hard rubber annulus to form a unitary packing structure and the clamp engaging face of the inner portion thereof projects slightly beyond the end face 27 of the base ring. The annular lip 37 has an outwardly tapering annular face 38 that sealingly contacts with the working surface of the cylinder and an inner beveled face 39 which corresponds to the bevels 13 of the clamping members so that the lips are supported thereby from distortion when the piston is in service. The terminal portions 40 of the lips, when in relaxed condition, as shown in Fig. 2, are of normally larger circumference than the inner circumference of the cylinder so that when the packing rings are secured in the piston assembly and the piston assembly is started in the cylinder, the lips are compressed over the rounded peripheries 14 of the disc portions of the clamping members, as shown in Fig. 1.

The spacing plate 8 comprises a flat member formed of metal and the outer peripheral face 41 is of smaller diameter than the faces 35 of the packing rings and the opening 42 therein is of such diameter that the plate is freely slidable on the collar 18. In order to enhance sealing engagement of the clamping faces 11 with the facings 34 of the packing rings, the clamping members are preferably provided with annular ribs 43 that project from the clamping faces 11 thereof and which are adapted to imbed in the soft rubber facings of the packing rings, as shown in Fig. 1.

In assembling the piston parts constructed as described, the clamping member 4 is pressed upon the tapered portion 20 of the piston rod so that it is rigidly retained from longitudinal movement thereon. The packing ring 6, spacing plate 8 and the ring 7 are then sleeved over the hub or collar 18 after which the clamping member 5 is sleeved over the extension 22 and the jam-nut 25 applied on the threaded terminal of the piston rod. The jam-nut 25 is then tightened to draw the end faces 27 and 28 of the base rings into contact with the disc-like bodies of the clamping members and with the respective sides of the separating plate to maintain a fixed spacing of the parts, as shown in Fig. 1. When thus tightened, the clamp engaged portions of the soft rubber of the packing rings are pressed between the clamping faces 11 of the clamping members and the side faces of the spacing plate 8 with the sealing ribs 43 pressed thereon so as to further prevent leakage between the clamping and packing members.

The flaring faces 39 of the flexible lip portions of the packing rings are firmly seated on the beveled faces 13 to support the terminals of the lips or flanges 40 in cylinder sealing position. The piston assembly is then inserted in the cylinder so that the flexible lips thereof are pressed over the rounded peripheries 14 of the clamping members, as shown in Fig. 1.

A piston constructed and equipped with packing rings as described is serviceable for long periods under high working pressures without leakage, and since the packing rings have sufficient body, they are rigidly clamped against any relative movement with respect to the other parts of the piston, and therefore cannot become distorted.

The lip portion of the sealing elements, however, have sufficient resiliency to assure adequate seal with the surfaces of the working cylinder responsive to the fluid pressures acting on the respective ends of the piston. Our improved construction also prevents leakage through the interior of the piston.

What we claim and desire to secure by Letters Patent is:

1. In a piston, a packing element including a metallic base ring, an annulus extending circumferentially of the base ring and formed of material having a relatively low degree of flexibility, a facing on said annulus having a laterally extending annular lip formed of material having a greater degree of flexibility and having autogenous connection with said annulus, said facing projecting slightly beyond the end of the base ring, and means clampingly anchoring the base ring to the piston including means for displacing said projecting portion of the facing to a degree limited by contact of said clamping means with the base ring.

2. In a piston, a packing element including a metallic base ring, an annulus extending circumferentially of the base ring and formed of material having a relatively low degree of flexibility, a facing on said annulus having a laterally extending annular lip formed of material having a greater degree of flexibility and having autogenous connection with said annulus, said facing projecting slightly beyond the end of the base ring, means clampingsly anchoring the base ring to the piston including means for displacing said projecting portion of the facing to a degree limited by contact of said clamping means with the base ring, and a rib on said clamping means for impression in said facing.

TWEED E. FAILING.
WALTER T. CALDWELL.